United States Patent [19]

Dick et al.

[11] 4,444,978
[45] Apr. 24, 1984

[54] THERMALLY STABLE CARBONATE POLYMER

[75] Inventors: Kevin F. Dick; David R. Near, both of Lake Jackson, Tex.

[73] Assignee: The Dow Chemical Company, Midland, Mich.

[21] Appl. No.: 518,774

[22] Filed: Jul. 29, 1983

[51] Int. Cl.$^3$ .................. C08G 63/62; C08G 79/04
[52] U.S. Cl. .................. 528/167; 528/125; 528/128; 528/169; 528/370; 528/371; 528/372
[58] Field of Search ............ 528/125, 128, 167, 169, 528/370-372

[56] References Cited

U.S. PATENT DOCUMENTS

| | | | |
|---|---|---|---|
| 3,378,523 | 4/1968 | Caldwell et al. | 260/47 |
| 3,578,634 | 5/1971 | Bialous et al. | 260/47 |
| 3,766,139 | 10/1973 | Bialous et al. | 260/47 XA |
| 3,880,799 | 4/1975 | Hoogeboom | 528/169 |
| 4,054,552 | 10/1977 | Hoogeboom | 260/47 XA |
| 4,123,420 | 10/1978 | Kyo et al. | 528/169 |
| 4,156,663 | 5/1979 | Okamoto et al. | 528/169 |
| 4,223,104 | 9/1980 | Kim et al. | 528/169 |
| 4,322,520 | 3/1982 | Schmidt et al. | 528/169 |
| 4,401,802 | 8/1983 | Schmidt et al. | 528/169 |

*Primary Examiner*—Lester L. Lee
*Attorney, Agent, or Firm*—B. G. Colley

[57] ABSTRACT

Carbonate polymers having increased thermal stability are prepared by incorporating into the polymer chain an oligomer having the formula

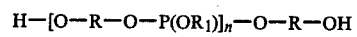

$$H-[O-R-O-P(OR_1)]_n-O-R-OH$$

wherein
R is the divalent residue of a dihydric phenol or a dihydric polynuclear phenol,
$R_1$ is an alkyl, aralkyl or alkaryl group having 1 to 25 carbons, and n is a number having an average value of 1-200.

9 Claims, No Drawings

THERMALLY STABLE CARBONATE POLYMER

BACKGROUND OF THE INVENTION

This invention relates to carbonate polymers having an effective amount of a phosphorous modified phenolic oligomer copolymerized therewith to render the polymers thermally stable.

It is known from U.S. Pat. No. 4,054,552 dated Oct. 18, 1977 that minor amounts of a phosphorodihalidous acid ester can be copolymerized with polycarbonates to render the copolymer thermally stable.

In a similar manner, hydrocarbyl phosphorus dihalides are taught in U.S. Pat. No. 3,766,139 dated Oct. 16, 1973 to give thermally stable polycarbonate resins.

SUMMARY OF THE INVENTION

The present invention is a carbonate polymer having improved thermal stability wherein the polymer has copolymerized therewith a small but effective amount of an oligomer having the formula

where
R is the divalent residue of a dihydric mononuclear phenol or a dihydric polynuclear phenol,
$R_1$ is an alkyl, aralkyl or alkaryl group having 1 to 25 carbons, and n is a number having an average value of 1-200.

Surprisingly, it has been found that the use of the above oligomers gives increased thermal stability over the use of the dihalo phosphorous compounds known in the art.

The amount of the oligomer which has been found to be effective is that amount in the range from 10 to 2000 parts per million based on the total weight of the polymer. A preferred range is 100 to 1000 parts per million.

Amounts less than the above effective range do not give the desired improvements and amounts greater than the range result in products which unacceptably poor color stability.

DETAILED DESCRIPTION OF THE INVENTION

The carbonate polymers employed in the present invention are advantageously aromatic carbonate polymers such as the trityl diols carbonates described in U.S. Pat. Nos. 3,036,036, 3,036,037, 3,036,038 and 3,036,039, polycarbonates of bis(ar-hydroxyphenyl)-alkylidenes (often called bisphenol-A type diols) including their aromatically and aliphatically substituted derivatives such as disclosed in U.S. Pat. Nos. 2,999,835, 3,038,365, and 3,334,154, and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of any one of the above carbonate polymers. Also included in the term "carbonate polymer" are the ester/carbonate copolymers of the types described in U.S. Pat. Nos. 3,169,121, 4,287,787, 4,156,069, 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The oligomers used in this invention have the formula

where
R is the divalent residue of a dihydric phenol or a dihydric polynuclear phenol,
$R_1$ is an alkyl, aralkyl or alkaryl group having 1 to 25 carbons, and n is a number having an average value of 1-200.

When the oligomers are made from dihydric mononuclear phenols, the phenols have the formula

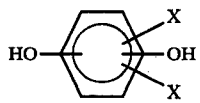

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons.

The preferred dihydric mononuclear phenols are xylene glycol, resorcinol, hydroquinone and catechol.

When the oligomers are made from polynuclear phenols they have the formula

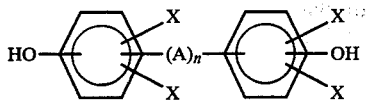

where
A is a single bond, a divalent hydrocarbon radical containing 1-15 carbon atoms,

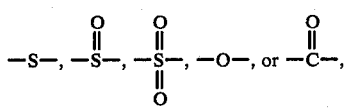

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and n is 0 or 1.

These oligomers are known and can be made by the processes set forth in U.S. Pat. Nos. 3,378,524 and 3,662,032. These references are incorporated by reference herein.

A preferred species of the oligomers is commercially available from Borg Warner Chemicals and is known as Weston MDW-439.

These preferred oligomers are believed to have the formula $$H-[O-R-O-P(OR_1)]_n-O-R-OH$$

where
R$_1$ is a mixture of C$_{12}$–C$_{15}$ alkyl groups,
n has an average value from 1 to 10, and
R is the divalent residue of bis A having the formula $$-\phi-C(CH_3)_2-\phi-$$

Additives can be included in the carbonate polymer composition of the present invention such as fillers (i.e., a tetrafluoroethylene polymer or glass fibers), pigments, dyes, antioxidants, ultraviolet light absorbers, mold release agents, fire retardant agents and other additives commonly employed in carbonate polymer compositions.

The following examples are given to further illustrate the invention and should not be construed as limiting its scope. In the following examples, all parts and percentages are by weight unless otherwise indicated.

EXAMPLE 1

1.193 moles of bisphenol-A (272.40 gm), 0.036 moles of phenol (3.42 gm), 0.057 gm of 4,4'-isopropylidenediphenol C$_{12}$–C$_{15}$ alkyl phosphite, 900.0 grams deionized water and 1326.6 grams methylene chloride were charged to a nitrogen purged, 5 liter round bottom flask equipped with a variable torque-constant speed stirrer. 2.422 moles of sodium hydroxide (193.80 gm of 50% NaOH in water) were added to the flask under sufficient agitation. The mixture was allowed to agitate under nitrogen for 5–10 minutes.

1.516 moles of gaseous phosgene (150.00 gm) were charged to the reaction mixture at a rate of 5 gm/min. while under sufficient agitation (300–500 rpm) to cause adequate turbulence. The reaction temperature was maintained at ~25° C. via an external ice water bath and the pH of the reaction mixture was maintained between 12.0 and 12.5 via the periodic addition of 50% (wt.) sodium hydroxide.

After the phosgene addition was complete the reaction mixture was allowed to agitate for 3–5 minutes at a pH of between 12.0 and 12.5. 0.007 moles of triethylamine (0.73 gm) were charged to the mixture. The reaction mixture was allowed to digest for 15 minutes and the pH was kept above 10 with the addition of 50% (wt.) sodium hydroxide.

The agitation was stopped and the reaction mixture was allowed to phase separate. After 5–10 minutes the aqueous phase was drawn off. 1326.6 grams of methylene chloride were added and the mixture agitated. After 5 minutes, 1000 grams of 2.5% (wt.) hydrochloric acid were added and the reaction mixture allowed to agitate for 10 minutes. The agitation was stopped and after 10–15 minutes the aqueous phase was removed. Two 1000 gram deionized water washes were then done on the polymer/methylene chloride solution. The washed polymer solution was then dried for removal of entrained water and filtered. The water-free polymer solution was combined with a hydrocarbon antisolvent in a high speed blender, then suction filtered to recover the polycarbonate resin. The polymer powder was then dried under vacuum at 125° C. for 16 hours. The final polymer is determined by elemental analysis as containing 6.8 ppm phosphorus (polymer basis). The polycarbonate resin had a molecular weight of 32,900 as determined by size exclusion chromatography. After drying the polymer was injection molded at 302° C. (575° F.) into transparent sample test discs 2" in diameter by ⅛" thick.

Sample test discs are also prepared from a polycarbonate synthesized as above without the addition of 4,4'-isopropylidenephenol alkyl (C$_{12}$–C$_{15}$) phosphite before polymerization. They are designed as Control 1 below. The samples are then tested for color as molded and after exposure to elevated temperature (heat aging) in accordance with the ASTM Yellowness Index test D-1925. The results are as follows:

TABLE I

| Sample | As Molded at 302° C. (575° F.) | Heat Aged at 140° C. (284° F.) for 500 Hours |
|---|---|---|
| Control 1 | 1.5 | 5.6 |
| Example 1 (6.8 ppm P) | 1.6 | 3.6 |

By the Yellowness Index test, the higher the number the greater the color. As can be seen, a polycarbonate of the previously described structure has improved color stability over the control sample.

EXAMPLE 2

1.769 moles of bisphenol-A (403.95 gm), 0.054 moles of phenol (50.8 gm), 0.084 gm of 4,4'-isopropylidenediphenol C$_{12}$–C$_{15}$ alkyl phosphite, 1335.0 grams deionized water and 1963.4 grams methylene chloride were charged to a nitrogen purged, 5 liter round bottom flask equipped with a variable torque-constant speed stirrer. 3.592 moles of sodium hydroxide (287.43 gm of 50% NaOH in water) were added to the flask under sufficient agitation. The mixture was allowed to agitate under nitrogen for 5–10 minutes.

2.245 moles of gaseous phosgene (222.08 gm) were charged to the reaction mixture at a rate of 5 gm/min. while under sufficient agitation (300–500 rpm) to cause adequate turbulence. The reaction temperature was maintained at ~25° C. via an external ice water bath and the pH of the reaction mixture was maintained between 12.0 and 12.5 via the periodic addition of 50% (wt.) sodium hydroxide.

After the phosgene addition was complete the reaction mixture was allowed to agitate for 3–5 minutes at a pH of between 12.0 and 12.5. 0.011 moles of triethylamine (1.09 gm) were charged to the mixture. The reaction mixture was allowed to digest for 15 minutes and the pH was kept above 10 with the addition of 50% (wt.) sodium hydroxide.

After recovery, the final polymer is determined by elemental analysis as containing 5.4 ppm phosphorus (polymer basis). The polycarbonate resin had a molecular weight of 30,000 as determined by size exclusion chromatography.

The dried polymer powder was compounded by torque rheometer at 282° C. (540° F.) for up to 30 minutes. Molecular weight by size exclusion chromatography was measured and compared to original values. A powdered polycarbonate similarly prepared but without the addition of 4,4'-isopropylidenediphenol alkyl (C$_{12}$–C$_{15}$) phosphite before polymerization was similarly evaluated. It is designated as Control 2 below. The results are as follows:

TABLE II

| Sample | Molecular Weight (Mw) | | |
|---|---|---|---|
| | Initial | Final | Change |
| Control 2 (no P) | 32000 | 28000 | 4000 |
| Example 2 (5 ppm P) | 30000 | 29000 | 1000 |

By this test, the greater the drop in molecular weight, the less stable the polymer to high temperature melt processing. As can be seen, a polycarbonate product of the previous described structure has improved thermal-/oxidative melt processing stability at high temperature over the control sample.

EXAMPLE 3

The procedure of Example 1 was repeated using 0.566 gm of 4,4'-isopropylidenediphenol $C_{12}$–$C_{15}$ alkyl phosphite.

After recovery of the polymer, it was analyzed by elemental analysis as containing 49.0 ppm phosphorus (polymer basis). The polycarbonate resin had a molecular weight of 29000 as determined by size exclusion chromatography. A similar polycarbonate having a molecular weight of 31000 was prepared without the phosphite as Control 3.

The dried polymer powder is evaluated against Control 3 as in Example 2. The results are as follows:

TABLE III

| Sample | Molecular Weight (Mw) | | |
|---|---|---|---|
| | Initial | Final | Change |
| Control 3 (no P) | 31000 | 26000 | 5000 |
| Example 3 (49 ppm P) | 29000 | 27000 | 2000 |

Control 4

The procedure of Example 1 was repeated except that 0.0111 grams of phenyl phosphorodichloridite was charged to the reaction mixture instead of the 4,4'-isopropylidenediphenol alkyl phosphite. The final polymer was determined by elemental analysis as containing 4.9 ppm phosphorus (polymer basis). The polycarbonate resin had a molecular weight of 31,600 as determined by size exclusion chromatography.

The dried polymer powder was evaluated against a control without the phosphorodichloridite as in Example 2. The results are as follows:

TABLE IV

| Sample | Molecular Weight (Mw) | | |
|---|---|---|---|
| | Initial | Final | Change |
| Control 3 (no P) | 31000 | 26000 | 5000 |
| Control 4 (4.9 ppm P) | 31600 | 22300 | 9300 |

As can be seen from the above results, a polycarbonate product of Control 4 demonstrates inferior thermal-/oxidative processing stability compared to an unformulated bisphenol-A polycarbonate base resin.

Phenylphosphorodichloridite has the formula $\phi$-O-P(Cl)$_2$.

Control 5

The procedure of Example 1 was repeated except that 0.0096 grams of phenylphosphonic dichloride was charged to the reaction mixture instead of the 4,4'-isopropylidenediphenol alkyl phosphite. The final polymer was determined by elemental analysis as containing 3.0 ppm phosphorus (polymer basis). The polycarbonate resin had a molecular weight of 30,200 as determined by size exclusion chromatography.

The hydrocarbon antisolvent recovered polymer powder was dried under vacuum at 125° C. for 16 hours. After drying, the polymer was injection molded into transparent sample test discs 2" in diameter and ⅛" thick.

The molded polymer was evaluated against Control 3 as in Example 1. The results are as follows:

TABLE V

| Sample | As Molded At 302° C. (575° F.) | Heat Aged at 140° C. (284° F.) For 500 Hrs. |
|---|---|---|
| Control 3 (no P) | 1.5 | 5.6 |
| Control 5 (3.0 ppm P) | 4.9 | 35.2 |

By the Yellowness Index test, the higher the number the greater the color. As can be seen, a polycarbonate of Control 5 composition will demonstrate inferior initial color and high temperature color stability as compared to an unformulated bisphenol-A polycarbonate base resin.

Phenyl phosphonic dichloride has the formula

$\phi$-P(O)(Cl)$_2$

Control 6

The procedure of Example 1 was repeated except that 0.0092 grams of dichlorophenylphosphine was charged to the reaction mixture instead of the 4,4'-isopropylidenediphenol alkyl phosphite. The final polymer was determined by elemental analysis as containing 3.7 ppm phosphorus (polymer basis). The polycarbonate resin had a molecular weight of 30,300 as determined by size exclusion chromatography.

The hydrocarbon antisolvent recovered polymer powder was dried under vacuum at 125° C. for 16 hours. After drying, the polymer was injection molded at 302° C. (575° F.) into transparent sample test discs 2" in diameter by ⅛" thick.

The molded polymer is evaluated for initial optical properties and compared to an unformulated bisphenol-A polycarbonate base resin (Control 3). The results are as follows:

TABLE VI

| Sample | % Light Transmittance | Yellowness Index |
|---|---|---|
| Control 3 (no P) | 90.8 | 1.5 |
| Control 6 (3.7 ppm P) | 88.6 | 4.0 |

As can be seen from the above results, a polycarbonate of Control 6 demonstrates comparatively inferior initial optical properties next to the unformulated control.

Dichlorophenylphosphine has the formula

$\phi$-P-(Cl)$_2$

EXAMPLE 4

Stabilized Polyestercarbonate Copolymer 1.244 moles of bisphenol-A (283.90 gms), 0.078 gms of 4,4'-isopropylidenediphenol $C_{12}$–$C_{15}$ alkyl phosphite, 3980 gms of methylene chloride and 3.234 moles of pyridine (255.81 gms) were charged to a 5 liter round bottom flask equipped with a variable torque-constant speed stirrer. After stirring for several minutes at about 200 rpm while purging with nitrogen, a clear solution of bisphenol-A was obtained. 0.622 moles of terephthaloyl chloride (126.28 gms) were added over a 2-3 minute period while stirring at 200-300 rpm and holding the temperature near 25° C. via an external ice water bath. The reaction mixture was then allowed to stir, under nitrogen, for an additional 10 minutes.

0.0404 moles of p-t-butylphenol (6.07 gms) were charged to the reaction flask followed by 0.622 moles of gaseous phosgene (61.50 gms) which was fed at about 2 gm/min. The reaction mixture was stirred at 200 rpm and the reaction temperature was held at 20°-23° C. during the phosgene feed.

The resulting copolymer product was recovered from the reaction mixture by the following procedure: 450 gms of 3 N hydrochloric acid was added to neutralize excess pyridine. Following phase separation the acidic aqueous phase was removed and the copolymer/methylene chloride solution washed with 500 gms of 0.5 N hydrochloric acid followed by phase separation and removal of the aqueous phase.

The copolymer/methylene chloride solution was then passed through a column packed with cation exchange resin giving a clear copolymer solution. This copolymer solution was then combined with a mixture of hydrocarbon antisolvents in a high speed blender to recover the polyestercarbonate resin. The copolymer powder was dried in air for 24 hours and then dried under vacuum for 48 hours at 120° C. The final copolymer is determined by elemental analysis as containing 4.8 ppm phosphorus (polymer basis). The polyestercarbonate resin had an inherent viscosity of about 0.539 dl/gm (measured in methylene chloride at 25° C., 0.5 gm/dl).

After drying, the copolymer was injection molded at 324° C. (615° F.) into transparent sample test discs 2" in diameter by ⅛" thick. Sample test discs were also prepared from polyestercarbonate of the same bisphenol-A/phthaloyl chloride ratio synthesized without the addition of 4,4'-isopropylidenediphenol alkyl ($C_{12}$-$C_{15}$) phosphite before polymerization. They are designated as Control 7 below. The samples were then tested for color as molded and after exposure to elevated temperature (heat aging) in accordance with the ASTM Yellowness Index Test D-1928. The results are as follows:

TABLE VII

| Sample | As Molded At 324° C. (615° F.) | Heat Aged at 170° C. (338° F.) For 305 Hrs. |
|---|---|---|
| Control 7 (no P) | 7.2 | 36.3 |
| Example 4 (4.8 ppm P) | 4.8 | 12.2 |

By the Yellowness Index test, the higher the number the greater the color. As can be seen, a polyestercarbonate of Example 4 has improved color stability over the control sample.

We claim:

1. A carbonate polymer with improved thermal stability having a thermally effective amount of a phosphorous modified phenolic oligomer copolymerized therewith wherein the oligomer has the formula $$H-[O-R-O-P(OR_1)]_n-O-R-OH$$

where

R is the divalent residue of a dihydric mononuclear phenol or a dihydric polynuclear phenol, $R_1$ is an alkyl, aralkyl or alkaryl group having 1 to 25 carbons, and n is a number having an average value of 1-200.

2. The carbonate polymer of claim 1 wherein R is the divalent residue of a dihydric mononuclear phenol having the formula

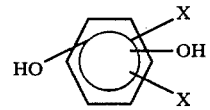

X is independently hydrogen, chlorine, bromine, fluorine, or a monovalent hydrocarbon radical selected from the group consisting of an alkyl group of 1-4 carbons, an aryl group of 6-8 carbons, an oxyalkyl group of 1-4 carbons or an oxyaryl group of 6-8 carbons.

3. The carbonate polymer of claim 2 wherein said mononuclear phenol is selected from the group consisting of xylene glycol, resorcinol, hydroquinone, and catechol.

4. The carbonate polymer of claim 1 wherein R is the divalent residue of a dihydric polynuclear phenol having the formula

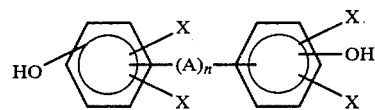

where

A is a single bond, a divalent hydrocarbon radical containing 1-15 carbon atoms,

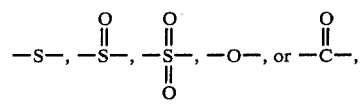

X is independently hydrogen, chlorine, bromine, fluorine, or a monovalent hydrocarbon radical selected from the group consisting of an alkyl group of 1-4 carbons, an aryl group of 6-8 carbons, an oxyalkyl group of 1-4 carbons or an oxyaryl group of 6-8 carbons and n is 0 or 1.

5. The polymer of claim 1 wherein said effective amount is 10 to 2000 parts per million based on the polymer weight.

6. A carbonate polymer with improved thermal stability having a thermally effective amount of a phosphorous modified bisphenol A oligomer copolymerized therewith wherein the oligomer has the formula $$H-[O-R-O-P(OR_1)]_n-O-R-OH$$

where $R_1$ is a mixture of $C_{12}$-$C_{15}$ alkyl groups, n has an average value from 1 to 10, and R is the divalent rasidue of bisphenol A.

7. The polymer of claim 6 wherein said effective amount is 10 to 2000 parts per million based on the polymer weight.

8. The carbonate polymer of claim 6 wherein the polymer is a bisphenol A polycarbonate.

9. The carbonate polymer of claim 6 wherein the polymer is a polyestercarbonate.

* * * * *